(12) United States Patent
Findlay

(10) Patent No.: US 9,006,636 B2
(45) Date of Patent: Apr. 14, 2015

(54) RADIATION SENSOR

(75) Inventor: Ewan Findlay, Dollar (GB)

(73) Assignee: STMicroelectronics (Research & Development) Limited, Marlow, Buckinghamshire (GB)

(*) Notice: Subject to any disclaimer, the term of this patent is extended or adjusted under 35 U.S.C. 154(b) by 866 days.

(21) Appl. No.: 13/241,096

(22) Filed: Sep. 22, 2011

(65) Prior Publication Data

US 2012/0132788 A1 May 31, 2012

(30) Foreign Application Priority Data

Nov. 30, 2010 (GB) .................................. 1020279.4

(51) Int. Cl.
*G01J 1/42* (2006.01)
*G06F 1/16* (2006.01)
*G01J 1/02* (2006.01)
*G01J 1/04* (2006.01)
*G01J 1/06* (2006.01)
*G01J 5/00* (2006.01)
(Continued)

(52) U.S. Cl.
CPC ............. *G06F 1/1684* (2013.01); *G01J 1/0219* (2013.01); *G01J 1/0271* (2013.01); *G01J 1/0411* (2013.01); *G01J 1/0422* (2013.01); *G01J 1/06* (2013.01); *G01J 1/4204* (2013.01); *G01J 1/4228* (2013.01); *G01J 5/0025* (2013.01); *G01J 5/025* (2013.01); *G01J 5/0265* (2013.01); *G01J 5/041* (2013.01); *G01J 5/0806* (2013.01); *G01J 5/0896* (2013.01); *G01S 17/026* (2013.01); *H04M 1/72569* (2013.01); *G01S 17/36* (2013.01); *G01S 7/4816* (2013.01); *H04M 2250/12* (2013.01)

(58) Field of Classification Search
CPC ......... G01J 1/0219; G01J 1/0411; G01J 1/06; G01J 1/4228; G01J 1/0422; G01J 1/4204; G01J 1/0271; G01J 5/025; G01J 5/041; G01J 5/0896; G01J 5/0025; G01J 5/0265; G01J 5/0806; G06F 1/1684; G01S 7/4816; G01S 17/36; G01S 17/026; H04M 2250/12; H04M 1/72569
USPC ............ 250/221, 222.1, 216, 214 R, 214 AL, 250/208.2, 239
See application file for complete search history.

(56) References Cited

U.S. PATENT DOCUMENTS 4,835,595 A 5/1989 Oho et al.
4,972,089 A 11/1990 Stevenson
(Continued)

FOREIGN PATENT DOCUMENTS

DE 10201746 A1 8/2002
EP 1351319 A2 10/2003
(Continued)

OTHER PUBLICATIONS

UK Search Report mailed Jan. 19, 2011 for GB 1020279.4 (1 page).

*Primary Examiner* — John Lee
(74) *Attorney, Agent, or Firm* — Gardere Wynne Sewell LLP

(57) ABSTRACT

A radiation sensor is provided comprising: one or more first pixels and one or more second pixels. A first optical element is provided over the first and second pixels, having a first field of view. A second optical element is provided over the one or more second pixels, having a second field of view. The second optical element is positioned between the first optical element and the one or more second pixels, wherein the first field of view is substantially narrower than, and lies substantially within, the second field of view.

28 Claims, 12 Drawing Sheets

(51) Int. Cl.

| | | |
|---|---|---|
| *G01J 5/02* | (2006.01) | |
| *G01J 5/04* | (2006.01) | |
| *G01J 5/08* | (2006.01) | |
| *G01S 17/02* | (2006.01) | |
| *H04M 1/725* | (2006.01) | |
| *G01S 17/36* | (2006.01) | |
| *G01S 7/481* | (2006.01) | |

(56) References Cited

U.S. PATENT DOCUMENTS

| | | | |
|---|---|---|---|
| 5,130,531 A | 7/1992 | Ito et al. | |
| 5,340,993 A | 8/1994 | Salina et al. | |
| 5,382,810 A | 1/1995 | Isaksson | |
| 5,448,395 A | 9/1995 | Lopez et al. | |
| 5,684,294 A | 11/1997 | Kouhi | |
| 6,594,043 B1 | 7/2003 | Bloom et al. | |
| 7,123,154 B1 | 10/2006 | Smith | |
| 7,161,136 B1 | 1/2007 | Wenstrand et al. | |
| 7,196,316 B2 | 3/2007 | Chan et al. | |
| 7,262,402 B2 | 8/2007 | Niclass et al. | |
| 7,309,855 B2 | 12/2007 | Nagasaka et al. | |
| 7,375,803 B1 | 5/2008 | Bamji | |
| 7,554,076 B2 | 6/2009 | Wang et al. | |
| 7,617,980 B2 | 11/2009 | Saxena et al. | |
| 7,737,394 B2 * | 6/2010 | Ovsiannikov et al. | 250/226 |
| 8,228,410 B2 * | 7/2012 | Raynor et al. | 348/301 |
| 2004/0012029 A1 | 1/2004 | Bawolek et al. | |
| 2006/0016970 A1 | 1/2006 | Nagasaka et al. | |
| 2006/0091293 A1 | 5/2006 | Grueger et al. | |
| 2006/0146330 A1 | 7/2006 | Maniam | |
| 2007/0212681 A1 | 9/2007 | Shapiro et al. | |
| 2008/0006762 A1 | 1/2008 | Fadell et al. | |
| 2008/0219672 A1 | 9/2008 | Tam et al. | |
| 2008/0225140 A1 * | 9/2008 | Raynor et al. | 348/243 |
| 2009/0219432 A1 | 9/2009 | Palum et al. | |
| 2009/0234248 A1 | 9/2009 | Zand et al. | |
| 2009/0302329 A1 | 12/2009 | Noma et al. | |
| 2010/0085468 A1 | 4/2010 | Park et al. | |
| 2010/0127159 A1 | 5/2010 | Watanabe | |
| 2010/0277075 A1 | 11/2010 | Rees | |
| 2010/0282953 A1 | 11/2010 | Tam | |
| 2011/0057129 A1 * | 3/2011 | Yao et al. | 250/552 |
| 2011/0086676 A1 * | 4/2011 | Choi et al. | 455/567 |
| 2012/0074322 A1 * | 3/2012 | Skurnik | 250/338.4 |
| 2012/0087645 A1 | 4/2012 | Wu et al. | |
| 2012/0132788 A1 * | 5/2012 | Findlay | 250/208.2 |
| 2013/0341494 A1 * | 12/2013 | Fadell et al. | 250/214 AL |

FOREIGN PATENT DOCUMENTS

| | | |
|---|---|---|
| EP | 1764835 A1 | 3/2007 |
| JP | 10154825 A | 6/1998 |
| JP | 11261493 A | 9/1999 |
| JP | 11289105 A | 10/1999 |
| WO | WO-2009022282 A2 | 2/2009 |
| WO | WO-2009120568 A2 | 10/2009 |
| WO | WO-2010032306 A1 | 3/2010 |

* cited by examiner

RADIATION SENSOR

PRIORITY CLAIM

This application claims priority from United Kingdom Application for Patent No. 1020279.4 filed Nov. 30, 2010, the disclosure of which is hereby incorporated by reference.

TECHNICAL FIELD

The invention relates to a radiation sensor, a combined proximity and ambient light sensor and a mobile communications device comprising such a radiation sensor or combined proximity and ambient light sensor.

BACKGROUND

Ambient light sensors typically comprise a relatively small number (e.g. a 10×10 array) of exposed light sensitive pixels (compared to, for example, a camera module image sensor) for providing an indication of ambient light levels. Only a small number of pixels is required because it is not necessary for ambient light sensors to be capable of capturing a sharp image. They are used in many applications, including on mobile communications devices (such as mobile phones and PDAs), laptops, tablet computers, web-cams and the like.

Proximity sensors typically comprise a radiation source and a corresponding detector, the detector again comprising a relatively small number of exposed light sensitive pixels. Proximity sensing is achieved by: emitting light from the radiation source; capturing light which is reflected back to the detector by an object; and processing the reflected light to determine the proximity of the object. Proximity sensors are also used in many applications, including on mobile communications devices and vehicle parking sensors.

Ambient light and proximity sensors are typically formed on separate chips with separate sensor windows. Therefore, when they are both used together in a single device, the separate ambient light and proximity sensors have separate footprints and require separate sensor windows in the device casing.

SUMMARY

A first aspect of the disclosure provides a radiation sensor comprising: one or more first pixels and one or more second pixels; a first optical element provided over the first and second pixels and having a first field of view; and a second optical element provided over the one or more second pixels and having a second field of view, the second optical element being positioned between the first optical element and the one or more second pixels, wherein the first field of view is substantially narrower than, and lies substantially within, the second field of view.

Typically, the first optical element is positioned within the field of view of the second optical element.

Preferably, the first and second pixels are formed on a common substrate. More preferably the first and second pixels are part of the same pixel array. In one embodiment, one or more first pixels are adjacent the one or more second pixels. These features minimize the footprint of the radiation sensor. This is advantageous in the design of, for example, mobile communications devices where space is limited.

The field of views of the one or more first pixels are substantially determined by the first optical element, while the field of view of the second pixel (or the field of view of all the second pixels combined) is substantially determined by the second optical element. Thus, the first and second pixels can be used for different functions which require different fields of view. For example, but not exclusively, the radiation sensor according to the first aspect of the disclosure, in combination with a radiation source (which may be provided in the same package as the first and second pixels, or in a separate package or a separate package compartment), can be used as a combined radiation and proximity sensor.

Typically the first and/or second optical elements comprise a lens, a plurality of lenses or a diffractive optical element.

Preferably the shortest distance between the first optical element and the second optical element is substantially equal to a focal length of the first optical element. In this case, the one or more second pixels image the exit pupil of the first optical element. As such, the one or more second pixels image light incident on the sensor within the first field of view as if the first optical element was substantially omitted. That is, the effect of the first optical element on the light levels detected by the one or more second pixels is minimized.

Additionally or alternatively the shortest distance between the second optical element and one of the one or more second pixels is less than the shortest distance between the first optical element and said second pixel.

In a preferred embodiment, the one or more second pixels comprise sensing surfaces and the second optical element is formed on the sensing surfaces of the one or more second pixels.

Typically a radiation absorption filter is provided between the second optical element and one or more second pixels. This minimizes the in-band ambient radiation detected by the second pixels to minimize shot noise.

Typically, the second optical element comprises reflowed photoresist. This is advantageous as the manufacture of the second optical element can be integrated into existing pixel manufacturing processes.

In one embodiment, the second optical element has an exposed convex surface. The second optical element may comprise one or more exposed convex surfaces for focusing radiation onto a respective one of the one or more second pixels.

In a preferred embodiment, the second field of view has a half angle substantially between 25° and 45°.

Typically the second optical element comprises a microlens.

Preferably, the sensor comprises a plurality of first pixels.

Additionally or alternatively the sensor comprises a plurality of second pixels. In this case, the second optical element may comprise a plurality of lensing elements. Each lensing element may be provided above a respective second pixel. Preferably, the principle optical axis of each respective lensing element is offset from the principle optical axis of each respective second pixel. Typically the lensing elements are microlenses. Preferably, the field of view of a first lensing element overlaps the field of view of a second lensing element.

The first optical element typically has an exposed convex surface.

In a preferred embodiment, the first optical element is mounted above the first and second pixels. In this case, the first optical element is typically mounted on a substantially transparent mount.

The first and second pixels are preferably single photon avalanche detectors. However, it will be appreciated that the pixels may be any other alternative detectors such as silicon photodiodes which may be, for example, configured in photoconductive mode.

Preferably, the sensor comprises first readout circuitry for reading a signal from the first pixel and second readout circuitry different from the first readout circuitry for reading the signal from the second pixel.

Preferably the first and/or second pixels are provided with filters which transmit radiation of a first wavelength substantially unattenuated and block radiation of a second wavelength. Where both pixels are provided with filters, the filter provided for the first pixel transmits radiation of a first wavelength substantially unattenuated and blocks radiation of a second wavelength, while the filter provided for the second pixel blocks radiation of the first wavelength and transmits radiation of the second wavelength substantially unattenuated.

A second aspect of the disclosure provides a combined proximity and ambient light sensor comprising: one or more first pixels and one or more second pixels; a first optical element provided over the first and second pixels and having a first field of view; and a second optical element provided over the one or more second pixels and having a second field of view, the second optical element being positioned between the first optical element and the one or more second pixels, wherein the first field of view is substantially narrower than, and lies substantially within, the second field of view.

In one embodiment, the combined proximity and ambient light sensor of the second aspect of the disclosure further comprises a radiation source. The radiation source may be provided in a first sensor package compartment and the first and second pixels are provided in a second sensor package compartment optically isolated from the first sensor package compartment.

A third aspect of the disclosure provides a mobile communications device comprising the radiation sensor according to the first aspect of the disclosure or the combined proximity and ambient light sensor according to the second aspect of the disclosure.

BRIEF DESCRIPTION OF THE DRAWINGS

An embodiment of the invention will now be described, by way of example only, with reference to the drawings, in which.

DETAILED DESCRIPTION OF THE DRAWINGS

Introduction

Due to the ever increasing competition for space within the housing of mobile communications devices, it is desirable to combine the functions of an ambient light sensor and a proximity sensor onto a single image sensor chip. However, these functions have contradicting requirements. For example, as explained below, ambient light sensors require a wide field of view, while proximity sensors require a narrow field of view. Due to these competing requirements, ambient light sensors and proximity sensors are typically formed on separate chips with separate sensor windows which have a large combined footprint. There is therefore a need to resolve these competing requirements such that the ambient light and proximity sensing functions can be combined on a single chip.

Figure 1:
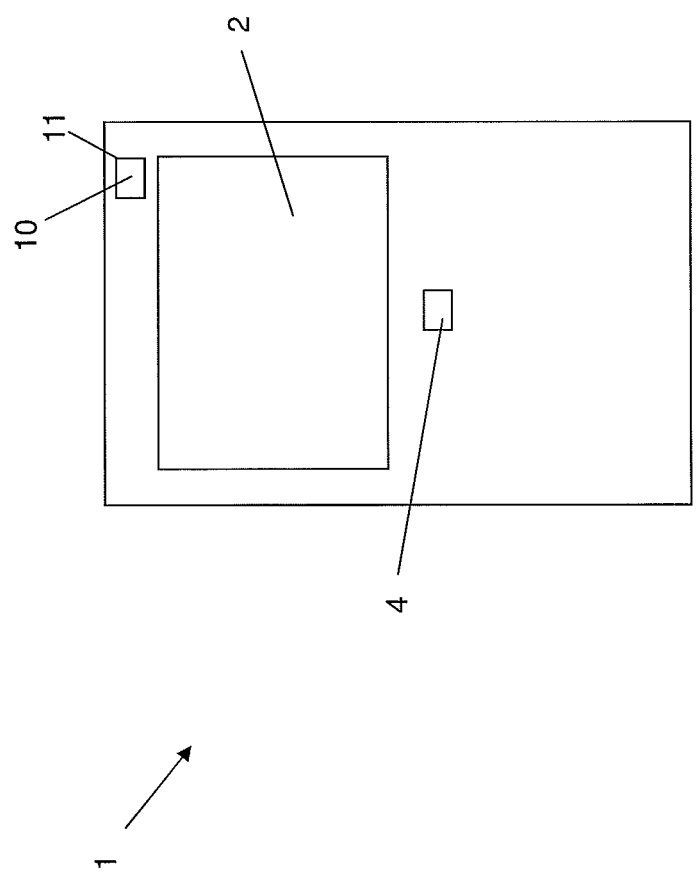
FIG. 1 is a schematic diagram of a mobile communications device comprising a combined proximity and ambient light sensor and a display.

FIG. 1 shows a mobile communications device 1, such as a mobile phone, mobile smart-phone or PDA, comprising a display 2, a controller 4 and a combined proximity and ambient light sensor 10. As described below, the proximity and ambient light sensing functions of the sensor 10 are combined on a single image sensor chip and share a single sensor window 11 in the casing of the mobile communications device 1.

It will be understood that the footprint of the combined ambient light and proximity sensor 10 is substantially smaller than the combined footprint of typical separate ambient light and proximity sensors.

Combined Proximity and Ambient Light Sensor

Figure 2:
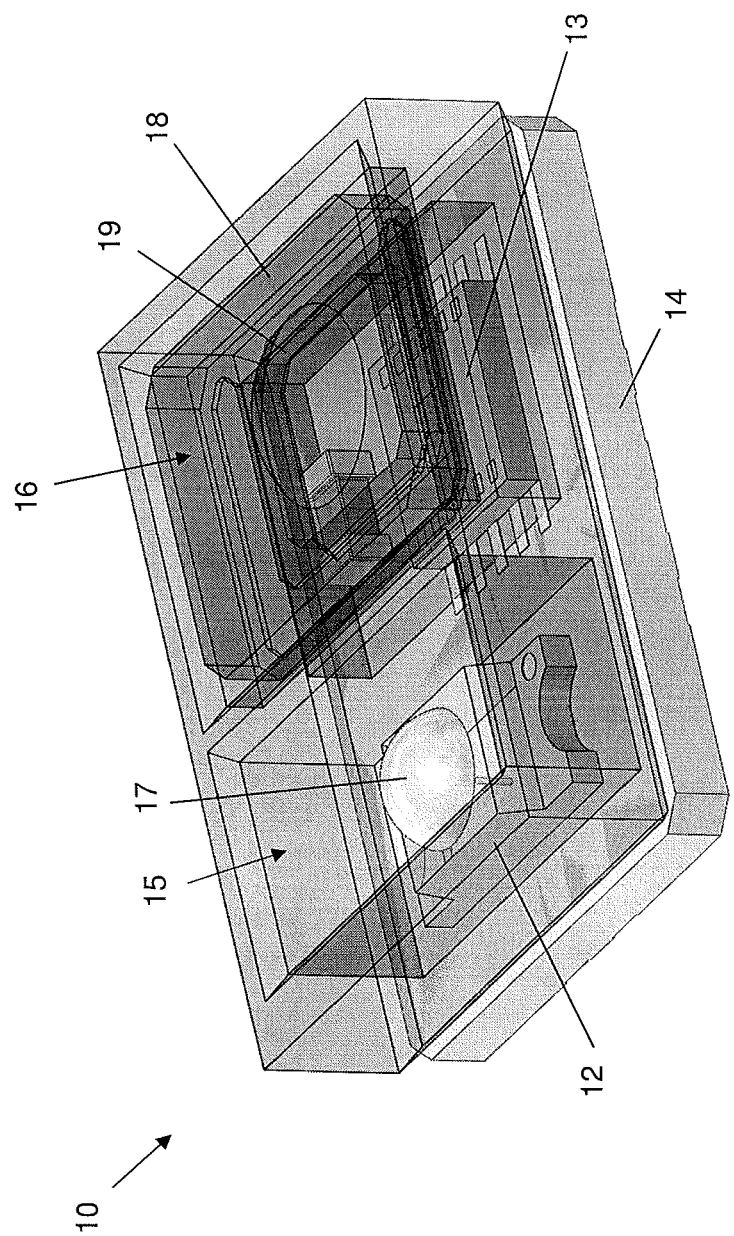
FIG. 2 shows a combined proximity and ambient light sensor formed on a single chip.

FIG. 2 is a perspective view of the combined proximity and ambient light sensor 10 which comprises a radiation source 12 and a radiation detector 13 mounted on a common package base 14 which is opaque to radiation emitted by the source 12. The radiation source 12 may be, for example but not exclusively, a modulated Light Emitting Diode (LED) or a semiconductor laser diode emitting in the infrared spectral region (e.g., at 850 nm). It will be assumed in the description below that the source 28 is an LED which has an emission spectrum around 850 nm. The source 12 and the detector 13 are provided in separate sensor package compartments 15, 16, each comprising four walls which extend vertically upwards from the base 14. The source 12 and detector 13 are optically isolated from each other by opposing walls of the compartments 15, 16 which are opaque to radiation emitted by the source 12. A custom hemispherical collimation lens 17 is provided over the source 12, while a substantially transparent (i.e. transparent to radiation emitted by the source 12) cover glass 18 comprising a hemispherical primary collection lens 19 is provided over the detector 13.

Figure 3:
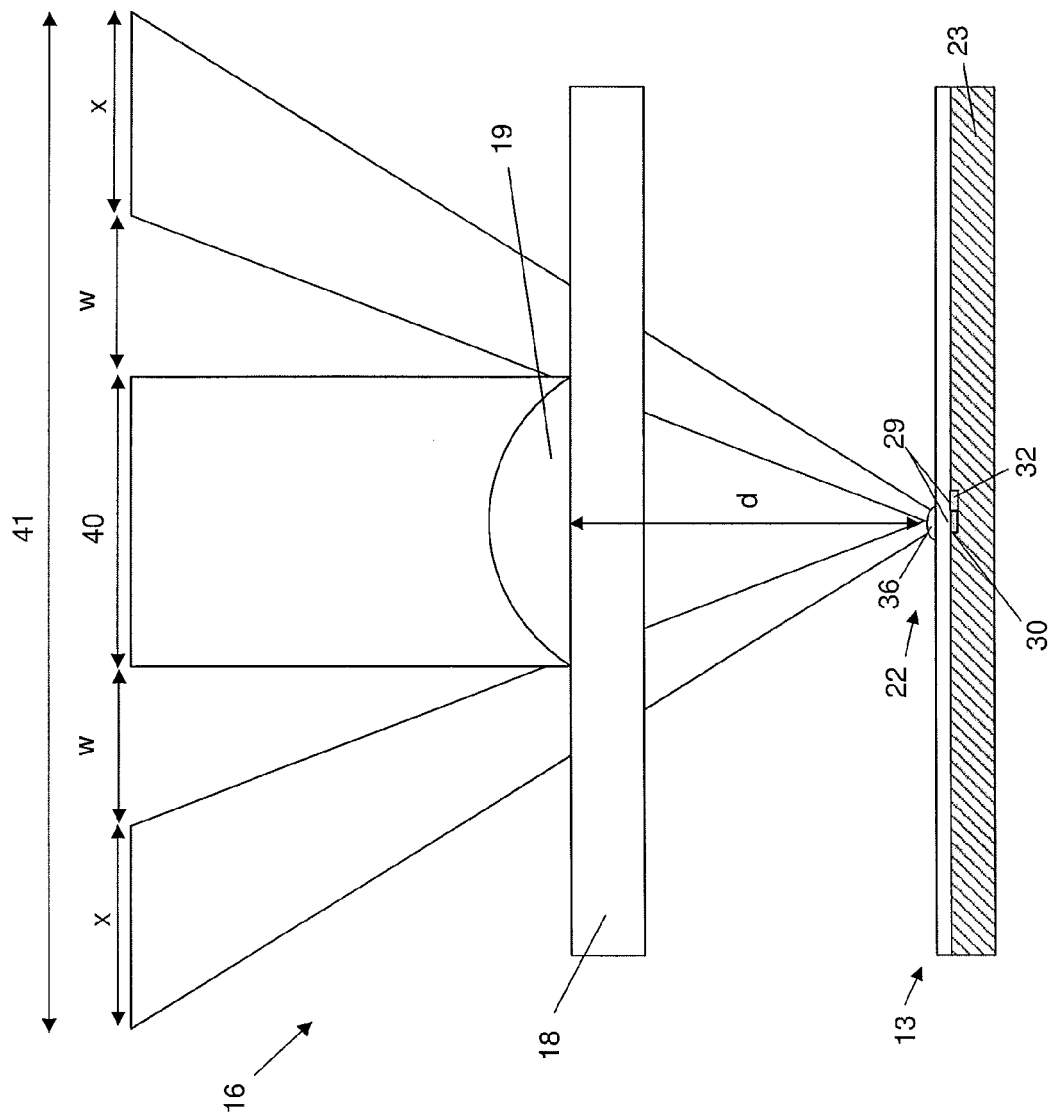
FIG. 3 is a schematic side view of the detector compartment of the sensor package of FIG. 2.

FIG. 3 is a schematic diagram of the sensor package compartment 16 which houses the detector 13. The detector 13 comprises a pixel array 22 formed on a substrate 23. The primary lens 19, which is positioned over all of the pixels in the array 22, has an exposed hemispherical (convex) surface for focusing incident light onto the pixel array 22. The pixels of the pixel array 22 have light sensitive (sensing) surfaces 29 which face the underside of the primary lens 19.

The pixel array 22 preferably comprises an array of adjacent single photon avalanche detectors (SPADs). A SPAD is based on a p-n junction device biased beyond it's breakdown region. The high reverse bias voltage generates a sufficient magnitude of electric field such that a single charge carrier introduced into the depletion layer of the device can cause a self-sustaining avalanche via impact ionization. The avalanche is quenched, either actively or passively to allow the device to be "reset" to detect further photons. The initiating charge carrier can be photo-electrically generated by means of a single incident photon striking the high field region. It is this feature which gives rise to the name 'Single Photon Avalanche Diode'. This single photon detection mode of operation is often referred to as 'Geiger Mode'.

Alternatively the pixel array 22 may alternatively comprise any other suitable radiation sensors such as silicon photodiodes configured in photoconductive mode.

The pixel array 22 comprises at least one ambient light sensing pixel 30 and at least one proximity sensing pixel 32, both of which are provided on the common chip substrate 23 but have separate signal readout circuitry. The pixels 30, 32 may be adjacent to each other.

The inventor has found that almost any arrangement of ambient light sensing pixels 30 and proximity sensing pixels 32 within the array can be employed to achieve reliable ambient light and proximity sensing. This is because the array 22 is small in comparison to the spot of radiation focused onto the array by the lens 19. However, at least one ambient light sensing pixel 30 is preferably positioned at or near the center of the array (i.e., substantially aligned with the principle optical axis of the primary lens) to keep the portion of the ambient light sensing pixel's field of view subtended by the primary lens central.

Figure 4:
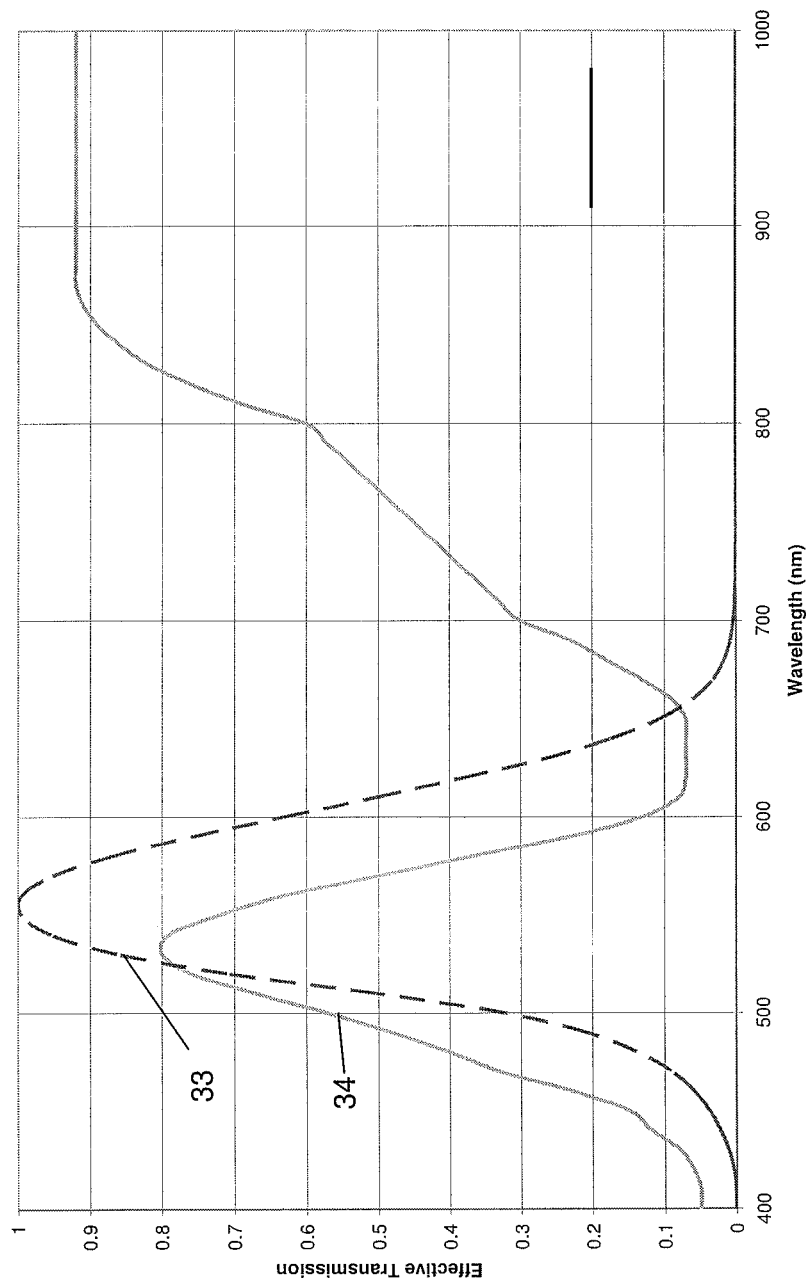
FIG. 4 shows the spectral responses of two exemplary visible-pass optical filters which may be provided over the ambient light sensing pixel(s)

An optical band-pass filter with a pass-band in the visible electromagnetic spectrum may be provided over the ambient light sensing pixel 30. The spectral responses of two exemplary filters are shown in FIG. 4. In one embodiment, the filter may comprise a pass-band 33 which matches the photopic response of the human eye (i.e., the pass-band 33 comprises the wavelength region between 513 nm and 608 nm). Alternatively, the filter may be a green-pass filter comprising a pass-band 34 which transmits radiation having a wavelength around that of green visible light. The green-pass filter response shown in FIG. 4 is less preferable as it also transmits infrared radiation having a wavelength above 800 nm. The filter may comprise a pigment carried in an organic resist material, and may be deposited and patterned on the pixel 30 by photo-lithography.

Figure 5:
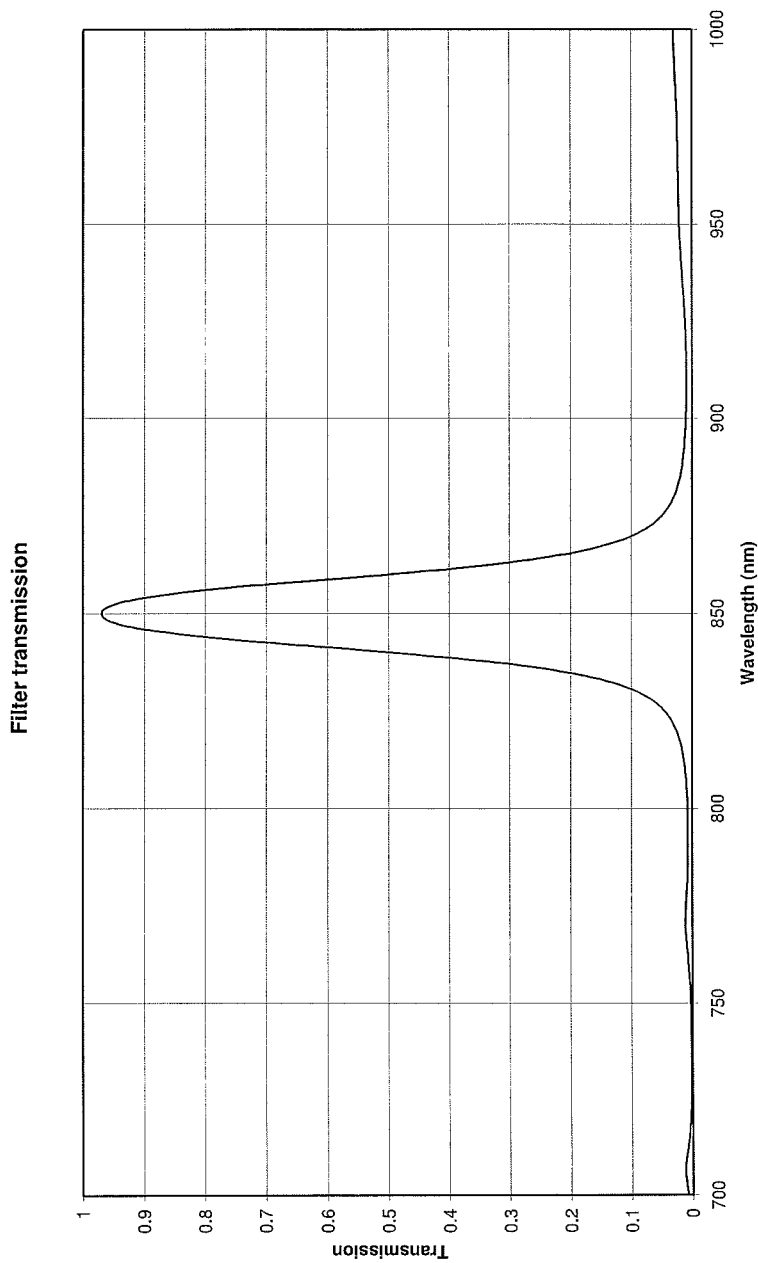
FIG. 5 shows the spectral response of an exemplary IR-pass filter which may be provided over the proximity sensing pixel(s)

A narrowband filter with a pass-band matching (at least a portion of) the output spectrum of the radiation source 12 may be provided over the proximity detecting pixel 32. The spectral response of an exemplary filter is shown in FIG. 5. In this case, the filter has a bell-shaped pass-band centered around 850 nm which matches that of the radiation source 12 and blocks radiation of all other wavelengths. Preferably, the filter has a full-width-half-maximum line-width which is less than that of the emission spectrum of the radiation source to minimize the amount of in-band ambient radiation detected by the proximity detecting pixel 32. As above, the filter may comprise a pigment carried in an organic resist material, and may be deposited and patterned on the pixel 30 by photo-lithography.

A secondary lens 36 is positioned over the ambient light sensing pixel 30, the secondary lens being positioned between the primary lens 19 and the ambient light sensing pixel 30. The shortest distance, d (see FIG. 3), between the primary lens 19 and the secondary lens 36 is preferably substantially equal to the focal length of the primary lens 19, $f_{primary}$. This will be explained further below. In the embodiment of FIG. 3, the secondary lens may be a microlens comprising an exposed hemispherical (convex) surface.

The skilled person will understand that a plurality of ambient light sensing pixels 30 and proximity sensing pixels 32 may be provided in the pixel array 22, each ambient light sensing pixel being provided with a secondary lens 36 (and each proximity sensing pixel 32 not being provided with such a secondary lens 36).

Microlenses

Figure 6:
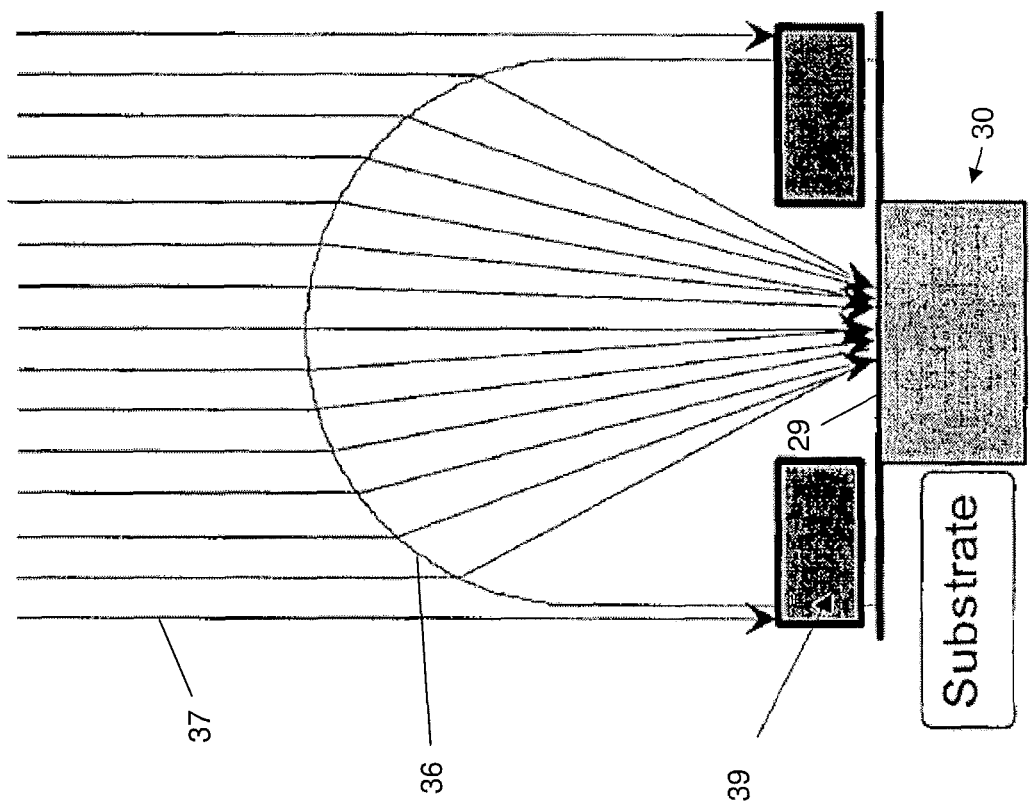
FIG. 6 is a schematic section view of a microlens formed on the sensing surface of a pixel.

A microlens 36, as shown in FIG. 6, is a three dimensional (substantially transparent) structure formed on, and in intimate contact with, the sensing surface 29 of the ambient light sensing pixel(s) 30 that functions to concentrate incident radiation 37 towards said sensing surface 29 of the pixel (usually positioned at the center of the pixel). Microlenses have a characteristic dimension (diameter) that is one, or many more (up to, say, six or seven), orders of magnitude less than the size of the primary lens 19. Furthermore, as explained below, the microlenses are formed as one of the manufacturing steps in the formation of the pixel array itself, and are thus thought of as being "part" of the pixel array. They are a design feature of the pixel array that serves to maximize the fill factor of the pixels in the array. FIG. 6 also shows pixel circuitry 39 extending between the sensing surfaces 29 of adjacent pixels 30.

Microlenses may be distributed over a plurality of pixels in the array 22 (one microlens per pixel) to form a plurality of ambient light sensing pixels 30 (see FIG. 11 described below). For example, but not exclusively, a 4×4 array of ambient light sensing pixels 30 may be formed as part of the pixel array 22. Alternatively a microlens may be provided over a single pixel 30.

Figure 7:
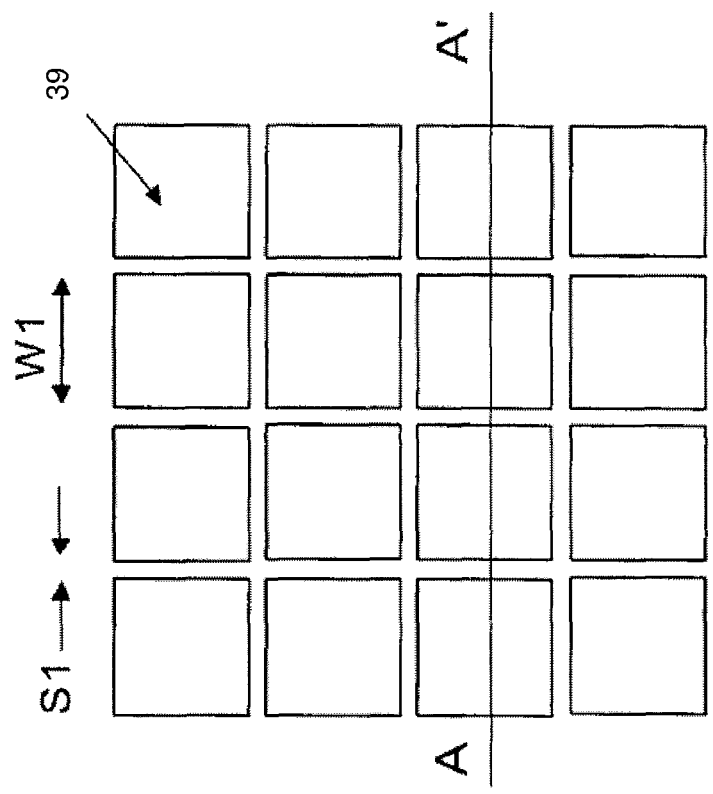
FIGS. 7 to 10 illustrate the manufacturing process of a plurality of microlenses.
Figure 8:
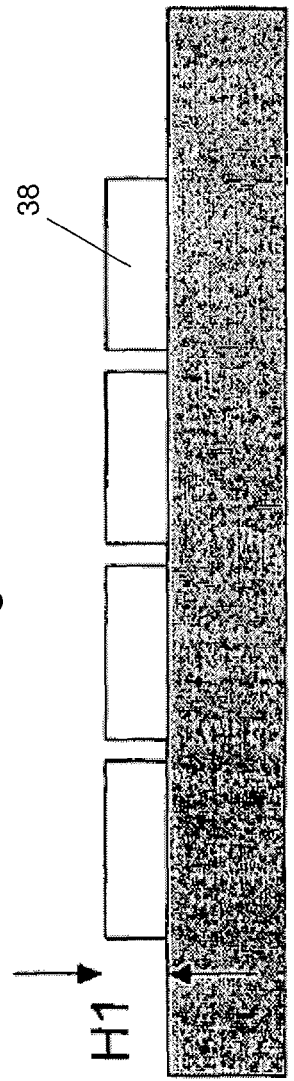

Microlenses are formed by depositing a photoresist material on the sensing surfaces of the pixels. This is illustrated in FIG. 7 which shows a 4×4 pixel array with photoresist deposited on the sensing surface of each pixel. The photoresist has been patterned using photo-lithography (aligned to the pixel structure) and etched to form the structure illustrated in FIG. 7. A grid of volume portions 39 of photoresist is formed (one per pixel), each having a width W1 and being separated by a distance S1. FIG. 8 shows a cross-section through the line A-A' illustrated in FIG. 7. Each volume portion 39 has a height H1.

The microlenses are typically matched to the pitch of the sensor, i.e. the sensor pixel pitch is equal to S1+W1. In one embodiment, this may be 4 μm-10 μm.

Figure 9:
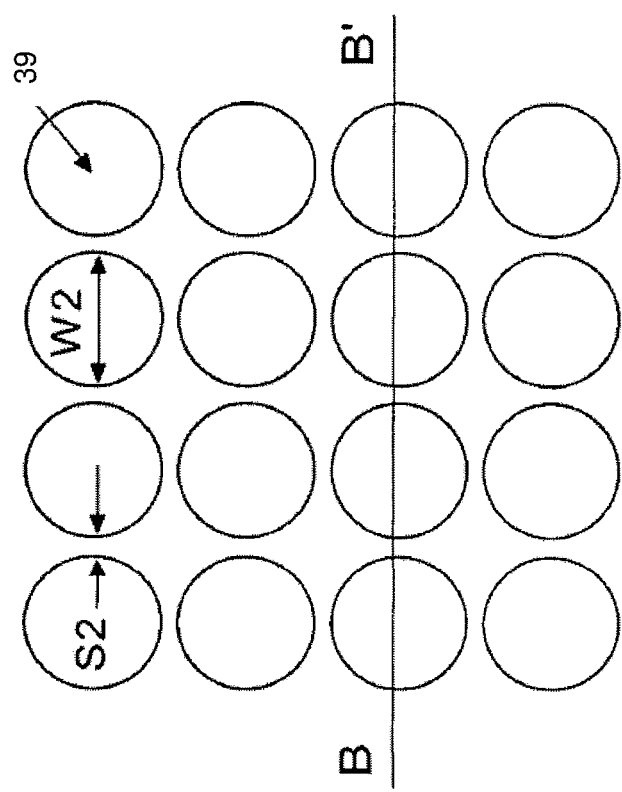
Figure 10:
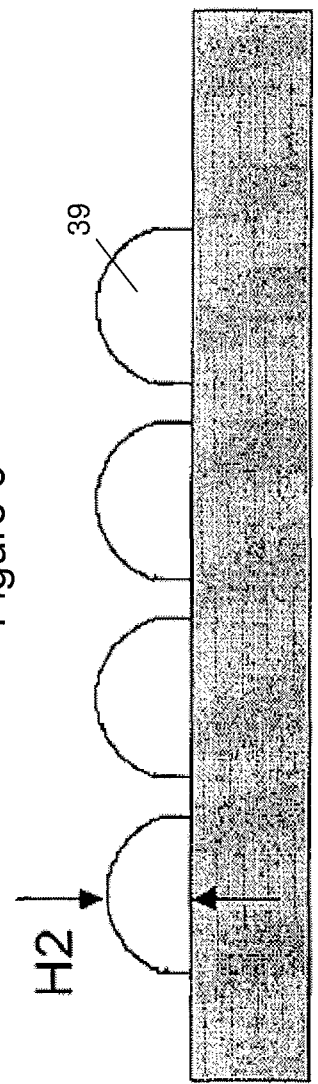

The photoresist is then deformed by heating it until it melts, in what is referred to as a reflow process. This is carried out at a relatively low temperature (e.g. 200 DEG C)—lower than the typical manufacturing temperature for the silicon (from which the pixels 22 are made), so the silicon is undamaged. When the microlens material melts, surface tension causes it to form a hemisphere. FIGS. 9 and 10 illustrate the microlenses after being deformed by the heating process. After the heating process, volume portions 39 have a width W2 and are spaced apart by a distance S2. FIG. 10 shows a cross-section along B-B'. Each volume portion 39 has a height H2 after heating. During this process, the volume of and pitch between the microlenses remains unchanged. However, the shape and height does change, where W2>W1 and S2<S1. H1 determines H2, from which the curvature and the focusing properties of the microlens are derived.

The initial spacing between microlenses, S1, is critical. For construction of an efficient microlens, if S1 is too large, the light-collecting efficiency of the microlens will be reduced. However, if S1 is too small, two adjacent microlenses will touch and surface tension will prevent the microlens from forming correctly. The term "adjacent" in this context is taken to mean that two microlenses correspond to adjacent pixels on the array of the sensor. In practice, two microlenses may be considered as being "adjacent" if they are nearest neighbors and there is a risk of them merging when they deform under heat. S1 will ideally be as small as possible. However, for the formation of microlenses, practical values are 1 µm-2 µm.

The microlens(es) are preferably formed on top of the visible-pass filter (where one is provided), but may alternatively be formed between the filter and the sensing surface of the pixel 30.

It will also be understood that the secondary lens 36 need not be a microlens and that any other suitable secondary lens 36 may be alternatively employed.

The proximity detecting pixel(s) 32 is (are) not typically covered by a secondary lens.

Fields of View

The field of view of the proximity detecting pixel 32 (which lacks a secondary lens) is substantially determined by the characteristics of the primary lens 19, while the field of view of the ambient light sensing pixel 30 is substantially determined by the characteristics of the secondary lens 36.

More specifically, the primary lens 19 provides the proximity sensing pixel 32 with a narrow field of view which is dictated by the solid-angle the sensitive area of the pixel 32 subtends at the center of the primary lens 19. It is noted that, where a plurality of proximity sensing pixels are provided, the field of view of the proximity sensing function of the sensor as a whole will also be affected by the number of proximity sensing pixels 32 and their spacing.

The secondary lens provides the ambient light sensing pixel 30 with a wider field of view than that of the proximity sensing pixel. This is because the ambient light sensing pixel 30 is closer to the secondary lens than the proximity sensing pixel 32 is to the primary lens 19. More specifically, the viewing cone half-angle $\theta_{ALS}$ (and the focal length, $f_{secondary}$) of the secondary lens 36 (and thus of the ambient light sensor pixel 30) is determined by the thickness of the microlens 36 and by the diameter of the ambient light sensing pixel 30:

$$f_{secondary} = z_{oxide}/n_{oxide}$$

$$\theta_{ALS} = \tan^{-1}(d_{detector}/2f_{secondary})$$

where:
$f_{secondary}$ is the focal length of the secondary lens 16;
$z_{oxide}$ is the thickness of the microlens;
$n_{oxide}$ is the refractive index of the microlens;
$\theta_{ALS}$ is the half angle of the ambient light sensing pixel viewing cone; and
$d_{detector}$ is the diameter of the ambient light sensing pixel detector.

FIG. 3 illustrates the narrower field of view (or viewing cone) 40 of the primary lens 19 (and thus the proximity sensing pixel 32) and the wider field of view 41 of the secondary lens 36 (and thus the ambient light sensing pixel 30). It is also shown in FIG. 3 that the field of view 40 of the primary lens 19 lies substantially within the field of view 41 of the secondary lens 36. This dual-lens design thus provides the ambient light sensing pixel 30 with a wide field of view for ambient light sensing and the proximity detecting pixel 32 with a narrow field of view for proximity detection. The reasons for this are explained in more detail below.

For completeness, it is noted that the cover glass 18 does not substantially affect the field of view of either the ambient light sensing pixel 30 or the proximity detecting pixel 32.

Figure 11:
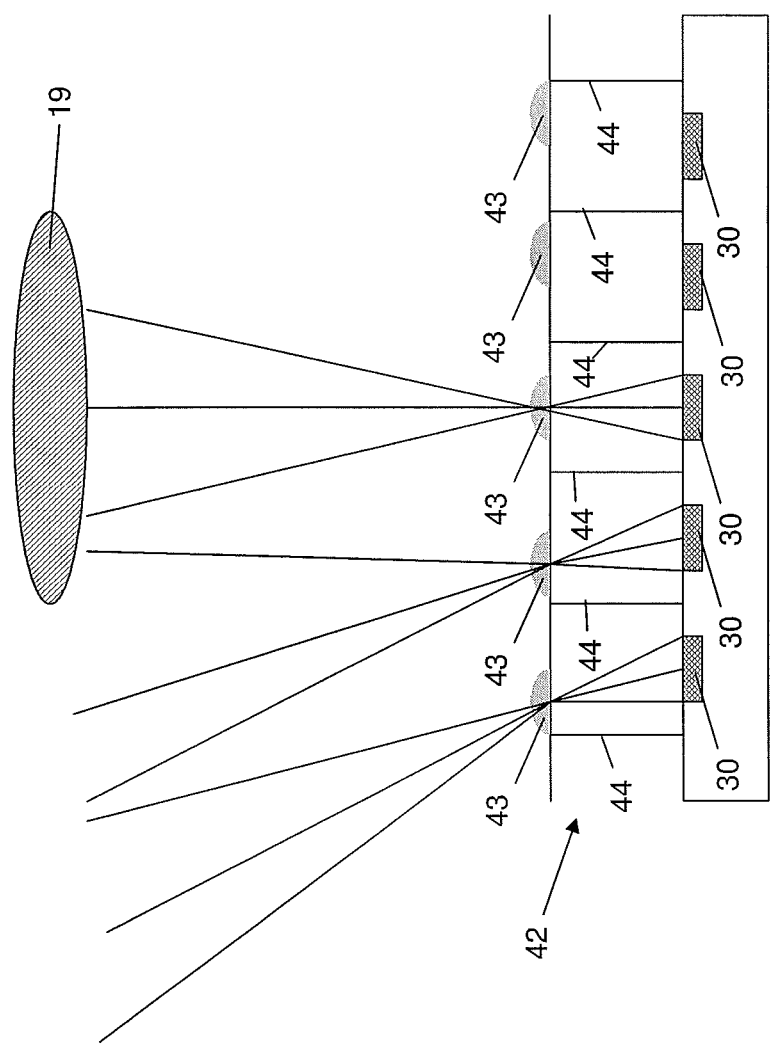
FIG. 11 shows an alternative embodiment of the disclosure comprising a plurality of ambient light sensing pixels, each covered by a microlens having a different field of view.

An alternative method of achieving a wide field of view for ambient light sensing is illustrated in FIG. 11, where a plurality (in this case an array) of ambient light sensing pixels 30 is provided. An optical element 42 comprising a plurality of microlenses 43 is provided over the ambient light sensing pixels 30 such that a respective microlens 43 is positioned over a respective pixel 30. Each microlens is offset from its respective pixel 30 by a different predetermined distance (that is, the principle optical axis of each respective lensing element is offset from the principle optical axis of each respective ambient light sensing pixel 30) so as to provide each pixel with a different field of view. The optical element 42 further comprises metallic partitions 44 which are provided between adjacent microlenses (and between adjacent pixels) to prevent the radiation incident on the microlenses 43 from being wrongly directed onto an adjacent pixel 30. Although each of the microlens/pixel combinations of FIG. 11 may have (but do not necessarily have) narrower fields of view than the microlens/pixel combination of FIG. 3, the respective fields of view overlap to form a combined field of view which is sufficiently wide for reliable ambient light sensing.

It is noted that, in this case, the field of view of the primary lens 19 is substantially narrower than, and lies substantially within, the combined field of view of the pixels 30.

It will be understood that, where the proximity sensing pixels 32 and the ambient light sensing pixels 30 are provided as part of the same pixel array, the optical element 42 may comprise gaps without microlenses where the proximity detecting pixel(s) 32 are positioned.

In the description below, it will be assumed that the embodiment of FIG. 3 is employed. However, it will be understood that the principles described below are equally applicable to the embodiment of FIG. 11.

Ambient Light Sensing

Referring back to FIG. 1, the perceived brightness of the display 2 can be affected by extreme (either very dark or very bright) ambient light levels. The ambient light sensing function of the sensor 10 provides the controller 4 with an indication of the ambient light level to enable the controller 4 to alter the brightness of the display 2 in response to the ambient light level. The ambient light sensing pixel 30 requires a wide field of view as it is necessary to detect ambient light levels over at least a significant portion of the hemisphere of illumination which can affect the flat surface of the display 2. However, it has been found that it is not necessary for the ambient light sensing pixel 30 to have a field of view across the entire hemispherical (180°) viewing cone of the surface of the display 2. Rather, the ambient light sensing pixel 30 can have a viewing cone coincident with the range of angles most likely to dull the perceived display brightness. Typically, a half angle $\theta_{ALS}$ of between 25° and 45° may be sufficient. This implies that an 8 µm diameter detector is required for the ambient light sensing pixel 30 and that the microlens 36 should be between 2.7 µm and 5.8 µm above the sensitive area of the proximity sensing pixel 32. A thinner total thickness of microlens and intervening layers will result in larger viewing cones.

Ambient light sensing may be performed simply by reading (and processing) the electrical signal generated by the ambient light sensing pixel 30 when it is exposed to the ambient radiation. Referring again to FIG. 3, the field of view 41 of the secondary lens 36 (and thus of the ambient light sensing pixel 30) comprises three regions: an outer ring, x; a central region which corresponds with the field of view 40 of the primary lens 19; and an inner ring, w, between the outer ring, x, and the central region 40. Light incident on the ambient light sensing pixel 30 within the outer ring, x, is substantially unaffected by the presence of the primary lens 19. Therefore, light incident within the outer ring is directly incident on the secondary lens 41 without being affected by the primary lens 19.

Conversely, light incident within the central region 40 and the inner ring, w, is substantially prevented from being directly incident on the secondary lens 36 by the presence of the primary lens 19. There would thus typically be a concern that the presence of the primary lens 19 would significantly distort the ambient light level detected by the ambient light sensing pixel 30. However, the inventor has realized that the ambient light sensing pixel 30 images the exit pupil of the primary lens 19. The inventor has also realized that, by arranging the primary lens 19 relative to the pixel array 22 such that the shortest distance between the primary lens 19 and the ambient light sensing pixel 30 is substantially equal to the focal length, $f_{primary}$, of the primary lens 19, the effective exitance of the scene imaged by the ambient light sensing pixel 30 within the central region 40 is substantially similar (or even equal) to that in the outer ring x unaffected by the primary lens 19. That is, light incident on the sensor 1 within the central region 40 will be viewed by the ambient light sensing pixel 30 as if the primary lens 19 was substantially omitted.

As the filter positioned over the ambient light sensing pixel 30 transmits only visible light, the electrical signal generated by the ambient light sensing pixel 30 is proportional only to the visible content of the ambient radiation (all other ambient radiation being blocked by the filter). This is beneficial as only the visible content of the ambient radiation (and not, for example, infrared ambient radiation) affects the perceived brightness of the display. Therefore, accurate feedback data is provided to the controller 4 for controlling the brightness of the display. If the ambient light level falls below a certain threshold, the controller 4 may decrease the brightness of the display 2. Similarly, if the ambient light level increases beyond a different threshold, the controller 4 may increase the brightness of the display 2.

It is noted that the narrow inner ring, w, is not 'seen' by the ambient light sensing pixel 30 due to the presence of the primary lens 19. This can be compensated for by changing the threshold values below which (and/or above which) the controller 4 decreases (and/or increases) the brightness of the display 2. However, it has been found that this is not necessary in most cases.

Preferably, the radiation source 12 is deactivated when ambient light sensing is being performed. This can be done by the controller 4.

Proximity Sensing

The sensor 10 may also be used to detect the proximity of an object to the mobile communications device 1. This is done by: activating the radiation source 12 to emit radiation; detecting a portion of the radiation reflected by the object at the proximity detecting pixel 32 of the sensor 10; and processing the reflected radiation with the controller 4 to calculate the proximity of the object to the mobile communications device 1. This calculation may for example be based on a direct time of flight measurement. However, any suitable alternative method may be used, such as a Phase Shift Extraction Method (see below). If the object is found to be sufficiently close to the mobile communications device, it is assumed that the user is making a call and the controller 4 may switch off the display 2 completely and/or deactivate one or more user-controls of the device to prevent the user from unintentionally instructing the device 1 to perform a task. The proximity detecting pixel 32 requires a narrow field of view to minimize in-band ambient radiation (i.e. the radiation within the narrow-band filter provided over the proximity detecting pixel) it captures. As the radiation emitted from the radiation source (and reflected back from the object whose proximity is being detected) is typically directed within this narrow field of view over the required proximity sensing range (typically of the order 0.01 m to 0.5 m), a sufficient quantity of the reflected radiation can be detected to overcome the (minimized) in-band ambient radiation levels without having to average out the ambient radiation levels for too long. This allows the power consumption of the radiation source 12 to be minimized.

As an alternative to basing the proximity sensor on direct time of flight measurements, a Phase Shift Extraction Method may be used. This scheme is favored for SPADs in proximity detection applications and is well suited to systems which implement computation of the generalized range equation (see below). It is also typically robust to background ambient light conditions, and may be adapted to allow for varying modulation wave-shapes (i.e. sinusoidal or square).

It is important to understand the range equation derivation as it indicates the ease of applicability of SPADs to phase extraction proximity detection.

Distance is determined from the speed of light and time of flight (TOF), as follows:

$$s = ct$$

where s is distance, c the speed of light and t is time.

For a proximity sensing system, the distance is doubled due to the fact there are send and receive paths. As such the distance measured in a ranging system s is given by:

$$s = \tfrac{1}{2} ct$$

The time shift component (='t') due to the photon TOF, is dependent on the modulation frequency and phase shift magnitude of the waveform (compared to the radiation emitted from the radiation source 12).

$$t = \% \text{ shift of the returned waveform} \times t_{mod\_period}$$

and if $t_{mod\_period} = 1/f_{mod}$:

$$\Rightarrow t = \frac{\phi}{2\pi} o \frac{1}{f}$$

$$\Rightarrow t = \frac{\phi}{2\pi o f}$$

The units are in radians. Then by substituting the above equation back into the starting equation, the 'range equation' is expressed as:

$$\Rightarrow s = \frac{c o \phi}{4 \pi o f}$$

The critical component in this equation is $\phi$, which is the unknown component of the % shift of the returned waveform. The following section discusses how this can be determined.

Figure 12:
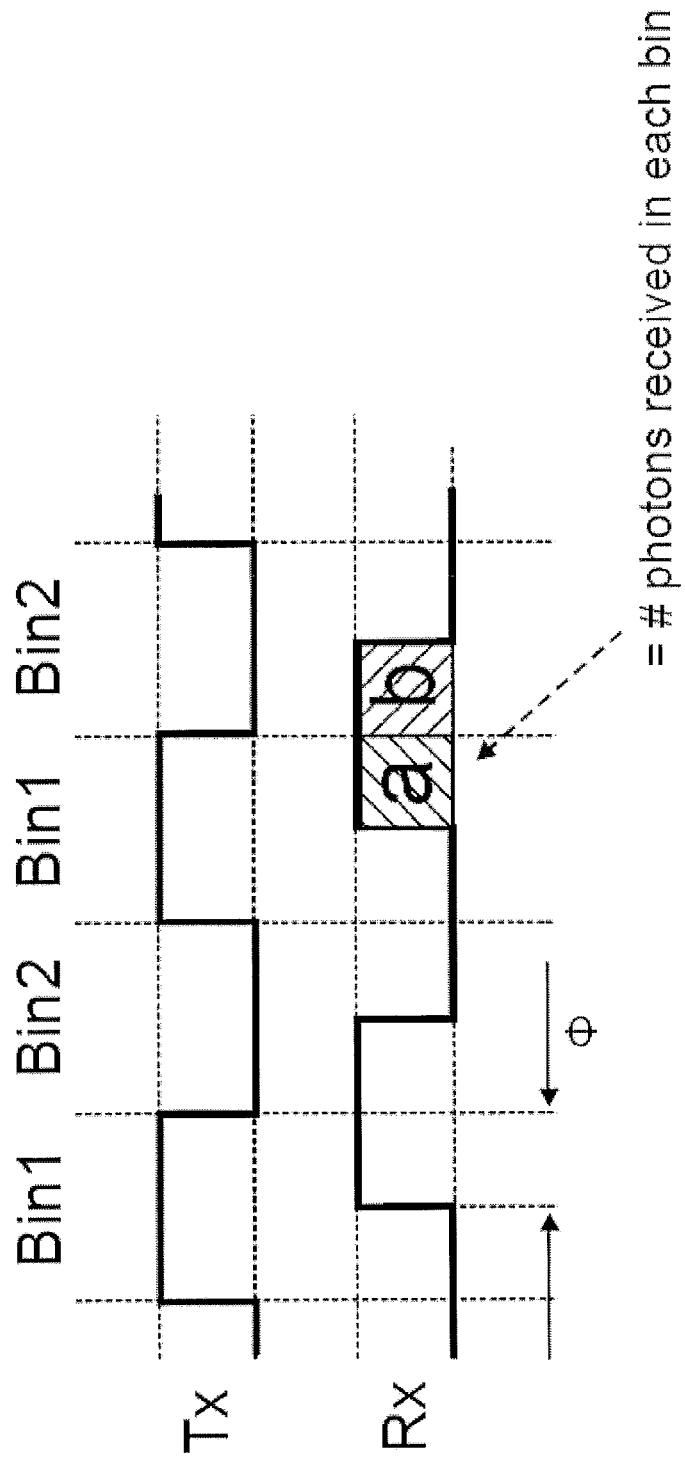
FIG. 12 is a wave diagram illustrating the Phase Shift Extraction Method.

Since the values of c, f and $\pi$ are all constants; the range result simply scales with $\phi$, (the % shift of the received light waveform in relation to that which was transmitted). FIG. 12 demonstrates how $\phi$ may be determined for a system employing a square wave modulated radiation source 12. The transmitted and received waveforms are shifted from one another by $\phi$. By measuring the photons that arrive in "a" and "b" in bins 1 and 2 respectively the value of $\phi$ can be determined as follows:

$$\frac{\phi}{2\pi} = \frac{b_{count}}{(a+b)_{count}}$$

In this type of system there is a range limit set by the radiation source modulation frequency, which is known as the unambiguous range. Photons received from targets that are further away than this range can introduce an aliasing error by erroneously appearing in a legitimate bin for a subsequent measurement. Since determination of range is enabled by the modulation process, it is desirable to maximize the number of edges of the modulation waveform in order to accumulate data for averaging purposes as fast as possible. However, a high modulation frequency may lower the unambiguous range and introduces more technical complexity in the driver circuitry of the radiation source 12. Therefore, two or more different modulation frequencies may be interleaved or used intermittently, so as to reduce or negate the impact of aliased photons via appropriate data processing.

Figure 13:
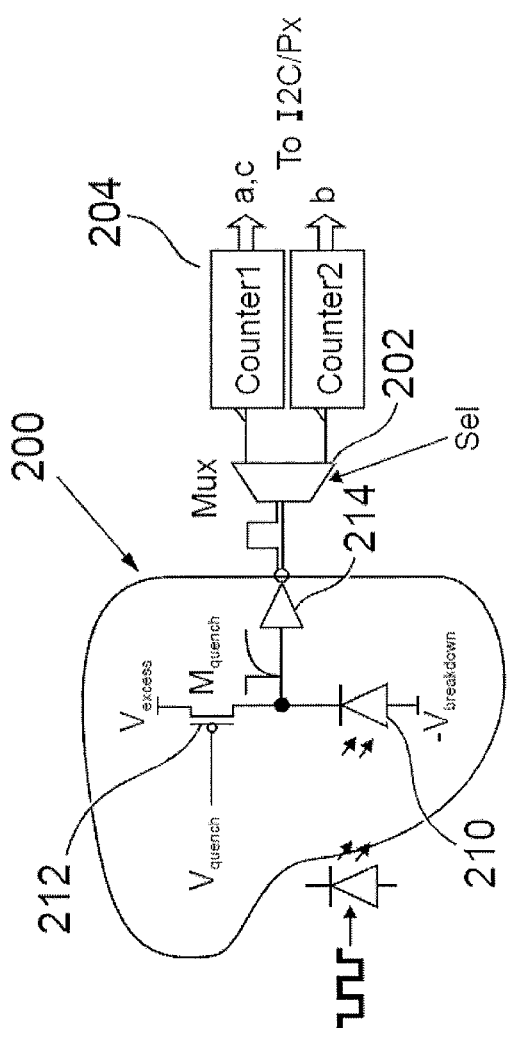
FIG. 13 illustrates a possible implementation of a SPAD based proximity sensor.
Figure 13:
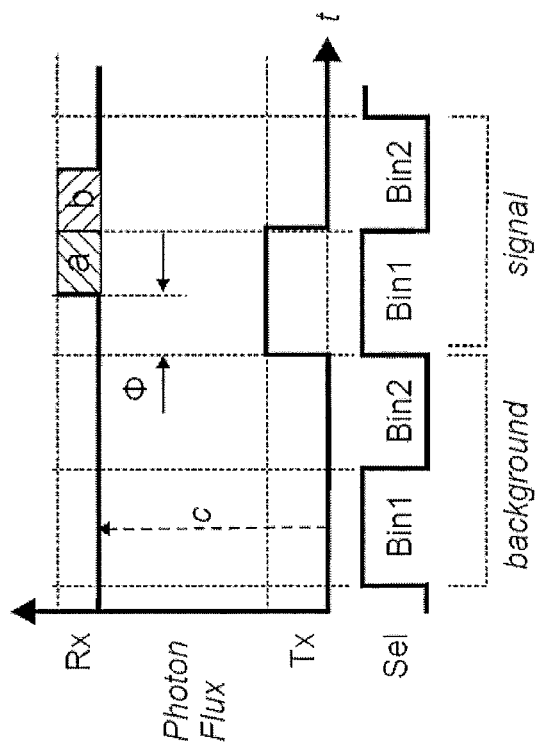

FIG. 13 illustrates a possible implementation of a SPAD based proximity sensor (which is implemented as part of the combined proximity and ambient light sensor 10) with an associated waveform diagram. FIG. 13 shows a SPAD 200 (which acts as the proximity sensing pixel 32) connected to a multiplexer 202. The output from the multiplexer passes through counters 1 and 2 (204). The SPAD shown generally at 200 is of a standard type, including a photo-diode 210, a p-type MOSFET 212 and a NOT gate 214.

The timing waveforms are shown in such a way so as to represent the relative photon arrival magnitudes. It can be seen that an extra phase has been added to enable computation of the background ambient light level offset 'c', although as mentioned above this can be significantly reduced by the use of a narrow optical band-pass filter matched to the wavelength of the radiation source 12. The element 'c' can be determined by deactivating the radiation source 12 and measuring the photon flux at the proximity sensing pixel 32. Where a narrow-band IR filter is employed in the optical path, the value of c will represent only the ambient content of the filter passband. This measurement of 'c' is then accommodated in the computation of received light phase shift $\phi$.

It is noted that the shot noise produced by the SPAD is proportional to the number of electrons it generates. Therefore, the greater the in-band ambient light signal detected by the proximity sensing pixel 32, the greater the shot noise. It is therefore preferable that the field of view of the proximity sensing pixel 32 is restricted to minimize the amount of in-band ambient radiation detected during proximity sensing so as to minimize shot noise. This decreases the detection time necessary to average out the noise and thus improves the performance of the ambient light sensing function.

The computed results for a, b, c are determined and written into either a temporary memory store or an I2C register. The computation of the phase shift $\phi$, is calculated as follows:

$$\phi = \frac{a_{count} - c}{(a+b)_{count} - 2c}$$

The predetermined selection of modulation frequency is performed by dedicated logic or host system which selects a suitable frequency or frequencies for the application of the range sensor. The proximity sensor of FIG. 13 is dependent on the amount of light that can be transmitted on to the scene, system power consumption and the target reflectivity.

Figure 14:
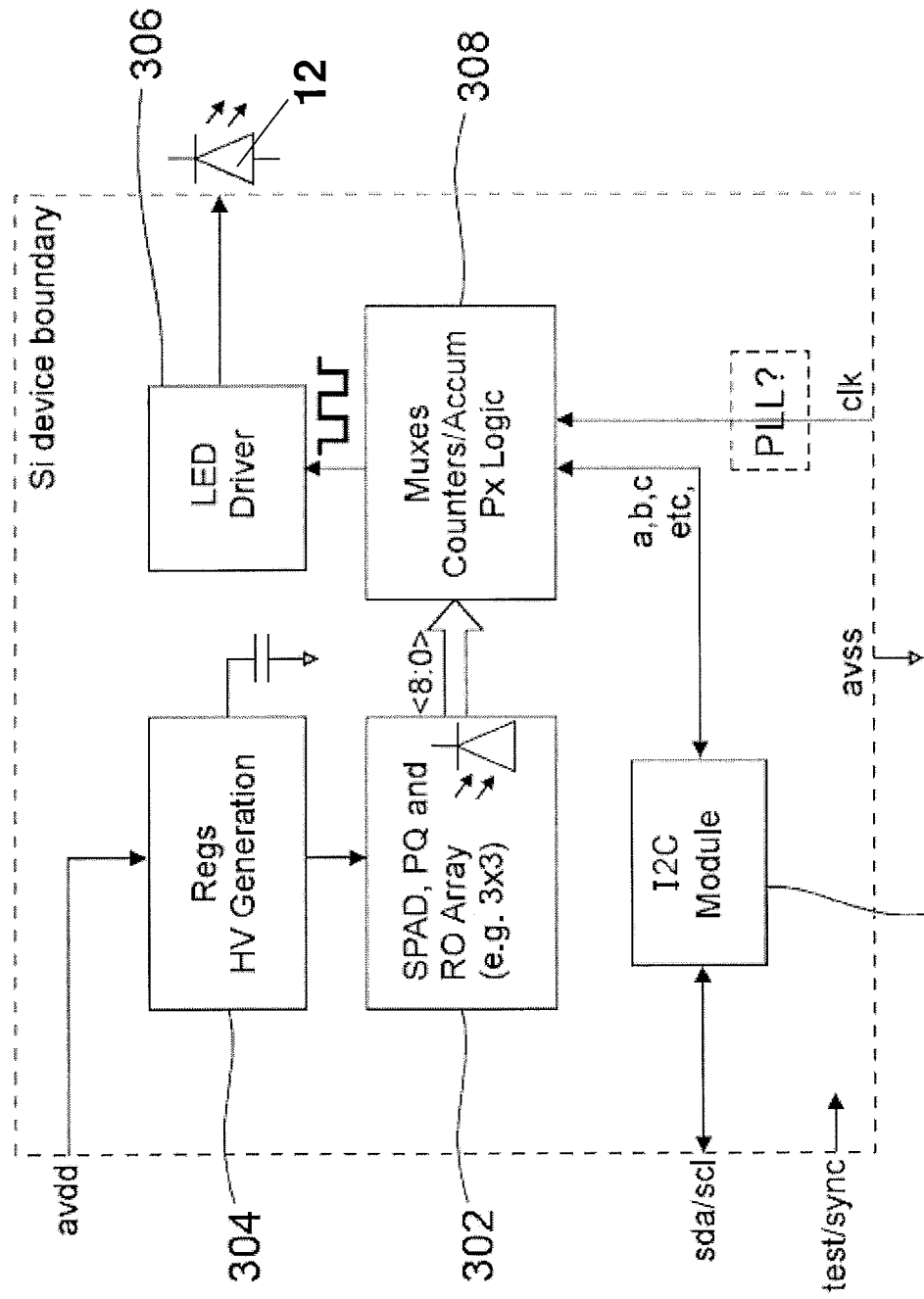
FIG. 14 is a block diagram of a SPAD based proximity sensor.

A block diagram of the required elements for the proximity sensing function of the sensor 10, where the pixel array 22 is a SPAD array, is shown in FIG. 14. The proximity sensor 300 includes SPAD function and the quenching thereof in block 302. The quenching can be passive as shown or of any other suitable type. The bias voltage for the SPAD may be provided by a charge pump or any other suitable device 304. The sensor also includes the radiation source 12 (such as an LED or semiconductor laser) and an associated driver 306 for applying the required modulation to the radiation source.

The sensor may include a distance computation logic module to determine range. Alternatively this can be located in the mobile communications device 1, optionally as part of the controller 4. The sensor 10 also includes multiplexers and counters 308 and a storage means 310, such as a I2C module. The sensor may also include a Phase Locked Loop (PLL) for clocking and subsequent timed signal generation purposes.

The power consumption of SPADs and their readout circuits is dependent on the incident photon arrival rate. The average power consumption of the proximity sensing function could be reduced by using power saving modes such as pulsed on/off operation, at a rate of ~10 Hz for example, at the expense of target motion distortion.

The sensor 10 may be implemented on a 1 mm$^2$ die size and the I2C module could also be implemented on an appropriate die. The primary lens 19 optimally gives the proximity sensing pixel 32 a field of view of about 30°. As the sensor is not intended to "create an image" but is instead used to ensure that as many photons as possible are detected, the primary lens 19 may be made from injection molded hemispherical elements.

It should be noted that the terms "optical", "illumination" and "light" are intended to cover other wavelength ranges in the spectrum and are not limited to the visual spectrum.

While this detailed description has set forth some embodiments of the present invention, the appended claims cover other embodiments of the present invention which may differ from the described embodiments according to various modifications and improvements. For example, the design described in detail above may be suitable for any radiation sensor requiring two different fields of view. In addition, any suitable optical element (with appropriate field of view characteristics) may be provided in place of the primary and secondary lenses. For example, optical elements comprising a diffractive optical element or a plurality of lenses may be employed in place of the primary and/or secondary lenses.

What is claimed is:

1. A radiation sensor comprising:
   one or more first pixels and one or more second pixels;
   a first optical element provided over both the first and second pixels and the one or more first pixels having a first field of view; and
   a second optical element provided over the one or more second pixels and the one or more second pixels having a second field of view, the second optical element being positioned between the first optical element and the one or more second pixels,
   wherein the first field of view is substantially narrower than, and lies substantially within, the second field of view.

2. The radiation sensor of claim 1 wherein the first optical element is positioned within the second field of view.

3. The radiation sensor of claim 1 wherein the first and second pixels are formed on a common substrate.

4. The radiation sensor of claim 1 wherein the first and second pixels are part of the same pixel array.

5. The radiation sensor of claim 1 wherein one or more first pixels are adjacent to one or more second pixels.

6. The radiation sensor of claim 1 wherein at least one of the first and second optical elements comprise one of a lens, a plurality of lenses and a diffractive optical element.

7. The radiation sensor of claim 1 wherein a shortest distance between the first optical element and the second optical element is substantially equal to a focal length of the first optical element.

8. The radiation sensor of claim 1 wherein a shortest distance between the second optical element and one of the one or more second pixels is less than a shortest distance between the first optical element and said second pixel.

9. The radiation sensor of claim 1 wherein the one or more second pixels comprise sensing surfaces and the second optical element is formed on the sensing surfaces of the one or more second pixels.

10. The radiation sensor of claim 1 further comprising a radiation absorption filter between the second optical element and one or more second pixels.

11. The radiation sensor of claim 1 wherein the second optical element comprises reflowed photoresist.

12. The radiation sensor of claim 1 wherein the second optical element has an exposed convex surface.

13. The radiation sensor of claim 1 wherein the second field of view has a half angle substantially between 25° and 45°.

14. The radiation sensor of claim 1 wherein the second optical element comprises a microlens.

15. The radiation sensor of claim 1 comprising a plurality of first pixels.

16. The radiation sensor of claim 1 comprising a plurality of second pixels.

17. The radiation sensor of claim 16 wherein the second optical element comprises a plurality of lensing elements.

18. The radiation sensor of claim 17 wherein each lensing element is provided above a respective second pixel.

19. The radiation sensor of claim 18 wherein the principle optical axis of each respective lensing element is offset from the principle optical axis of each respective second pixel.

20. The radiation sensor of claim 17 wherein the lensing elements are microlenses.

21. The radiation sensor of claim 17 wherein the first field of view overlaps the second field of view.

22. The radiation sensor of claim 1 wherein the first optical element has an exposed convex surface.

23. The radiation sensor of claim 1 wherein the first optical element is mounted above the first and second pixels.

24. The radiation sensor of claim 1 wherein the first and second pixels are single photon avalanche detectors.

25. Apparatus comprising a radiation sensor comprising:
one or more first pixels and one or more second pixels, the first pixels associated with a proximity sensing function and the second pixels associated with a ambient light detection function;
a first optical element provided over the first and second pixels and the first pixels having a first field of view for proximity sensing; and
a second optical element provided over the one or more second pixels and the second pixels having a second field of view for ambient light sensing, the second optical element being positioned between the first optical element and the one or more second pixels,
wherein the first field of view is substantially narrower than, and lies substantially within, the second field of view.

26. The apparatus of claim 25 wherein the sensor further comprises a radiation source.

27. The apparatus of claim 26 wherein the radiation source is provided in a first sensor package compartment and the first and second pixels are provided in a second sensor package compartment optically isolated from the first sensor package compartment.

28. The apparatus of claim 25 wherein the apparatus is a mobile communications device.

* * * * *